US012573792B2

(12) United States Patent
Nguyen et al.

(10) Patent No.: US 12,573,792 B2
(45) Date of Patent: Mar. 10, 2026

(54) RETRACTABLE CONNECTOR

(71) Applicant: Microsoft Technology Licensing, LLC, Redmond, WA (US)

(72) Inventors: Minh Cao Nguyen, Bothell, WA (US); David Scott Allaway, Bothell, WA (US); Gianna Marie Morena, Cranston, RI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 410 days.

(21) Appl. No.: 17/936,276

(22) Filed: Sep. 28, 2022

(65) Prior Publication Data

US 2024/0106163 A1 Mar. 28, 2024

(51) Int. Cl.

| | |
|---|---|
| ***H01R 13/60*** | (2006.01) |
| ***H01R 13/62*** | (2006.01) |
| ***H01R 13/635*** | (2006.01) |
| ***H01R 24/28*** | (2011.01) |

(52) U.S. Cl.

CPC ......... *H01R 13/60* (2013.01); *H01R 13/6205* (2013.01); *H01R 13/635* (2013.01); *H01R 24/28* (2013.01); *H01R 2201/06* (2013.01)

(58) Field of Classification Search

CPC .. H01R 13/60; H01R 13/6205; H01R 13/635; H01R 24/28; H01R 2201/06; H01R 13/516; H01R 24/60; H01R 13/44

See application file for complete search history.

(56) References Cited

U.S. PATENT DOCUMENTS

| | | | | |
|---|---|---|---|---|
| 4,844,582 A * | 7/1989 | Giannini | .............. | G02B 6/4292 385/59 |
| 5,015,061 A * | 5/1991 | Giannini | .............. | G02B 6/3886 385/56 |
| 5,921,783 A * | 7/1999 | Fritsch | ................. | H01R 13/703 439/700 |
| 7,074,061 B1 * | 7/2006 | Roth | ................ | G06K 19/07743 439/131 |
| 7,125,267 B1 * | 10/2006 | Yeh | ........................ | H01R 24/62 439/131 |
| 7,329,128 B1 * | 2/2008 | Awad | ................. | H01R 13/6205 439/38 |

(Continued)

FOREIGN PATENT DOCUMENTS

| | | | | |
|---|---|---|---|---|
| JP | 2004014384 A * | 1/2004 | ......... | H01R 13/6275 |
| SE | 535496 C2 | 8/2012 | | |

OTHER PUBLICATIONS

"3-in-1 Retractable Magnetic Charging Cable | PROMATE", Retrieved from: https://www.youtube.com/watch?v=JPMMAiHImrA, Jan. 11, 2022, 3 Pages.

(Continued)

*Primary Examiner* — Harshad C Patel
(74) *Attorney, Agent, or Firm* — Alleman Hall LLP

(57) ABSTRACT

A connector includes a housing including a plug opening and a cable opening. A cable extends through the cable opening away from the housing. An electronic plug is connected to the cable within the housing and extends through the plug opening away from the housing. The electronic plug is selectively moveable relative to the housing between an extended position and a retracted position when a pulling force is applied to the cable. A bias mechanism biases the electronic plug to the extended position.

18 Claims, 8 Drawing Sheets

(56) References Cited

U.S. PATENT DOCUMENTS 7,726,973 B1* 6/2010 Perry ................. H01R 13/6205 439/39
7,942,684 B1* 5/2011 Beak .................... H01R 13/639 200/51.12
8,360,797 B2* 1/2013 Deng ................. H01R 13/6335 439/345
8,672,228 B1* 3/2014 Saini ........................ G02B 6/36 439/39
9,004,930 B2* 4/2015 Gualino ............. H01R 13/6205 439/39
9,160,102 B1* 10/2015 Morgan ................. H01R 11/30
9,194,160 B1* 11/2015 Kelsch ................. H01R 13/622
9,431,182 B2* 8/2016 Kim ................... H01R 13/7038
10,483,688 B2* 11/2019 Wrisley ............... H01R 13/665
10,522,943 B1* 12/2019 Termini ................. H01R 24/86
11,070,000 B2* 7/2021 Song .................. H01R 13/4534
11,894,635 B2* 2/2024 Lin ...................... H01R 13/639
2007/0072442 A1* 3/2007 DiFonzo ............ H01R 13/6205 439/39
2013/0040470 A1* 2/2013 Gao ..................... H01R 43/048 29/874
2013/0323940 A1* 12/2013 Coffey ............... H01R 13/6205 385/139
2013/0328484 A1* 12/2013 Villarreal ........... H01R 13/7175 439/658
2014/0021915 A1* 1/2014 Staley .................. H01R 13/635 439/153
2014/0321049 A1* 10/2014 Ashcraft .............. H01R 13/635 361/679.43
2015/0111398 A1* 4/2015 Isenhour ............ H01R 13/6205 439/39
2015/0118874 A1* 4/2015 Watanabe .............. H01R 13/64 439/138
2015/0277491 A1* 10/2015 Browning ............. G06F 1/1632 248/346.03
2015/0318646 A1* 11/2015 Little ..................... H01R 24/60 439/78
2015/0333432 A1* 11/2015 Wu ...................... H01R 13/502 439/39
2016/0218462 A1* 7/2016 Zhao .................. H01R 13/6205
2017/0062974 A1* 3/2017 Daoura .............. H01R 13/6205
2017/0093087 A1* 3/2017 Esmaeili ............ H01R 13/6205
2018/0331468 A1* 11/2018 Little ................. H01R 13/6582
2018/0342840 A1* 11/2018 Messinger ................ H02J 7/02
2019/0009680 A1* 1/2019 Kauffmann ........... B60L 53/126
2019/0020150 A1* 1/2019 Whitehead ......... H01R 13/6275
2019/0109411 A1* 4/2019 Sun .................... H01R 13/6205
2019/0288469 A1* 9/2019 Messinger ............. H01R 24/28
2020/0194929 A1* 6/2020 Li ........................ H01R 13/504
2020/0254893 A1* 8/2020 McColl ................... B60L 53/16
2021/0006010 A1* 1/2021 Schreiber ............... H01R 13/60
2021/0399466 A1* 12/2021 Fong .................... H01R 13/629
2024/0258753 A1* 8/2024 Yan ........................ H01R 27/02
2024/0380159 A1* 11/2024 Dobler ................... H01R 31/06

OTHER PUBLICATIONS

"International Search Report and Written Opinion Issued in PCT Application No. PCT/US23/027959", Mailed Date: Oct. 18, 2023, 11 Pages.

* cited by examiner

RETRACTABLE CONNECTOR

BACKGROUND

A connector is removably affixable to an electronic device to provide a wired electrical connection between the electronic device and an external electrical source via a cable. The electrical connection is established upon insertion of the electronic plug into a plug receptacle of the electronic device. Likewise, the electrical connection is severed upon removal of the electronic plug from the plug receptacle of the electronic device.

SUMMARY

Examples are disclosed that relate to a retractable connector having features that promote low-friction engagement between an electronic plug of the connector and a plug receptacle of an electronic device that allows for easy removal of the electronic plug from the plug receptacle particularly when a cable of the connector is quickly pulled or jerked. In one example, a connector includes a housing including a plug opening and a cable opening. A cable extends through the cable opening away from the housing. An electronic plug is connected to the cable within the housing and extends through the plug opening away from the housing. The electronic plug is selectively moveable relative to the housing between an extended position and a retracted position when a pulling force is applied to the cable. A bias mechanism biases the electronic plug to the extended position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In a scenario where a connector is jerked suddenly, such as when someone accidentally trips on the cable, friction caused by interference between the electronic plug and the plug receptacle can keep the electronic plug engaged with the plug receptacle resulting in the electronic device being unwantedly pulled as well. Such unwanted pulling of the electronic device can cause the electronic device to be damaged. For example, the electronic device can be unwantedly pulled off a table and onto the floor causing the electronic device to become damaged. One factor that contributes to the electronic plug remaining engaged with the plug receptacle during such pulling is due to the electronic plug having a fixed position relative to the housing of the connector.

Accordingly, the present disclosure is directed to a retractable connector having features that promote low-friction engagement between an electronic plug of the connector and a plug receptacle of an electronic device that allows for easy removal of the electronic plug from the plug receptacle. The retractable connector includes an electronic plug that is moveable relative to a housing of the connector. The electronic plug moves to a retracted position before a pulling force applied to a cable of the connector exceeds a breakaway force sufficient to disengage the housing from the electronic device. In this way, when the cable of the connector is quickly pulled or jerked the electronic plug is retracted out of the plug receptacle and into the housing of the connector before the housing disengages from the electronic device.

The moveable electronic plug of the connector provides the technical benefit of reducing friction and/or binding between the electronic plug and the plug receptacle. This allows for the connector to be easily removed from the electronic device such that the electronic device is not unwantedly pulled by the connector. Additionally, a bias mechanism biases the electronic plug to a default extended position that facilitates alignment with a plug receptable when the electronic plug is inserted into the plug receptacle. The bias mechanism provides the technical benefit of reducing friction and/or misalignment between the electronic plug and the plug receptacle. Further, in some examples, the retractable connector includes additional features that promote low-friction engagement between the electronic plug and a plug receptacle of an electronic device as will be discussed in further detail below.

Figure 1:
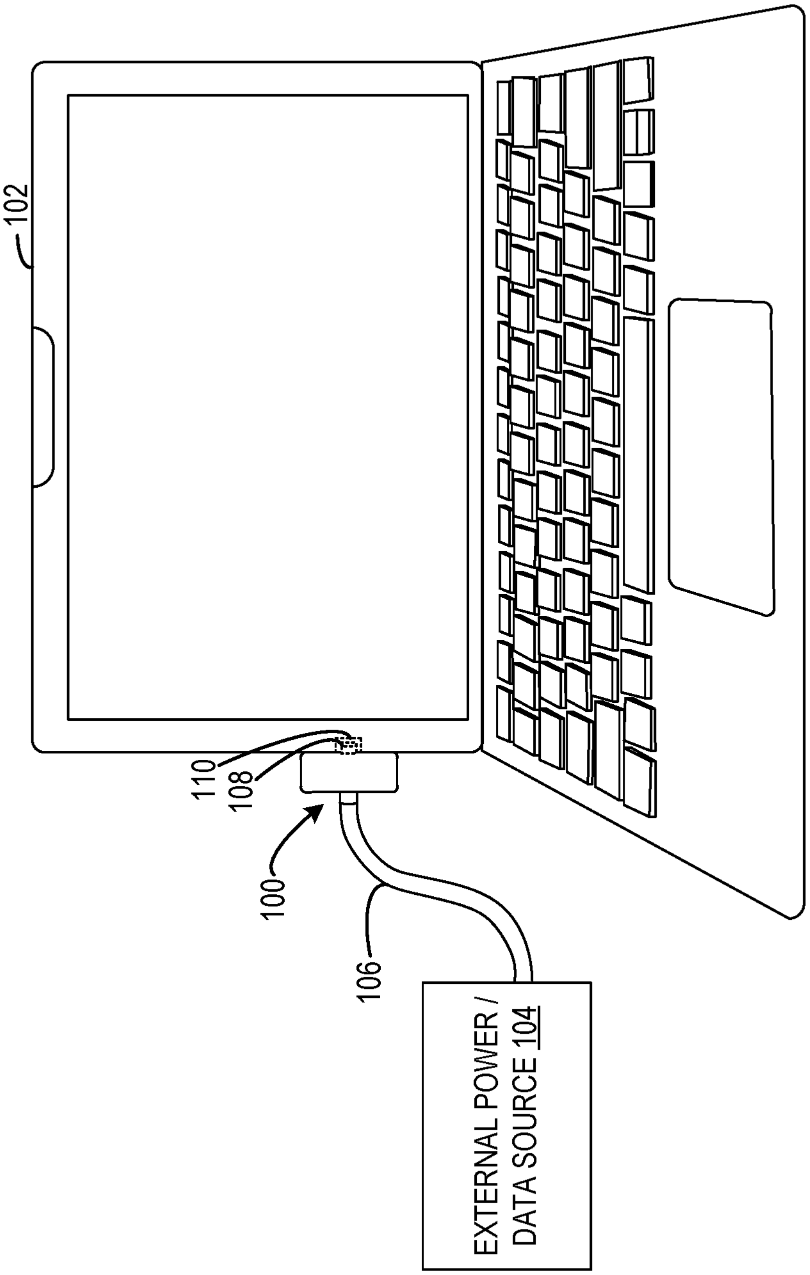
FIG. 1 shows an example retractable connector removably affixed to an electronic device.

FIG. 1 shows an example retractable connector 100 removably affixed to a laptop computer 102 to form an electrical connection between the laptop computer 102 and an external electrical power/data source 104 via a cable 106. In particular, the retractable connector 100 includes an electronic plug 108 that is inserted into a plug receptacle 110 of the laptop computer 102 to establish the electrical connection. The electronic plug 108 is connected to the cable 106 and the electronic plug 108 is selectively moveable between an extended position and a retracted position based at least on a pulling force applied to the cable 106. The electronic plug 108 is biased toward the extended position to maintain alignment with the plug receptacle 110 when the electronic plug 108 is inserted into the plug receptacle 110. The electronic plug 108 moves (e.g., slides) to the retracted position based at least on the cable 106 being quickly pulled or jerked by a pulling force. Such retraction of the electronic plug 108 reduces friction between the electronic plug 108 and the plug receptacle 110 that allows for the electronic plug 108 to be easily removed from the plug receptacle 110.

The retractable connector 100 enables the transmission of electrical power between the external electrical power/data source 104 and the laptop computer 102 via the electrical connection. In some examples, the retractable connector 100 enables the transmission of data between the external electrical power/data source 104 and the laptop computer 102 via the electrical connection. In some examples, the retractable connector 100 enables the transmission of both electrical power and data between the external electrical power/data source 104 and the laptop computer 102. In some examples, the retractable connector 100 is compatible with a USB-C type plug receptacle of an electronic device such as the laptop computer 102.

The external electrical power/data source 104 can take any suitable form. In some examples, the external electrical power/data source 104 is an electrical power source, such as an electrical power socket. In some examples, the external electrical power/data source 104 is an electrical power storage device, such as a battery. In some examples, the external electrical power/data source 104 is an external data storage device, such as a solid-state drive (SSD). In some examples, the external electrical power/data source 104 is another electronic device, such as another computer or computer peripheral.

The laptop computer 102 is provided as a non-limiting example of an electronic device to which the retractable connector 100 is removably affixable in order to establish an electrical connection with an external electrical power/data source. The retractable connector 100 is removably affixable to any suitable electronic device having a plug receptacle that is compatible with the electronic plug of the retractable connector 100.

Figure 2:
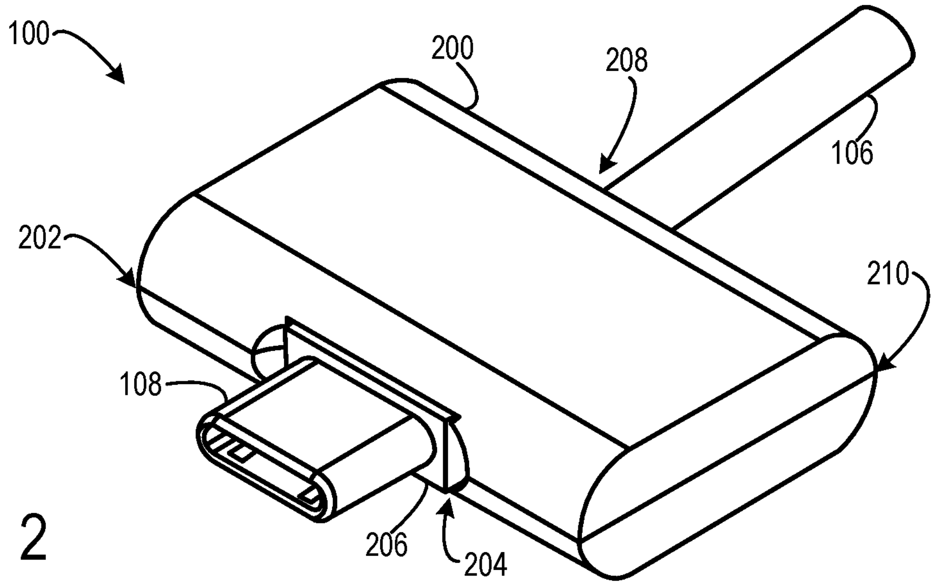
FIGS. 2-4 show different views of an example retractable connector.
Figure 3:
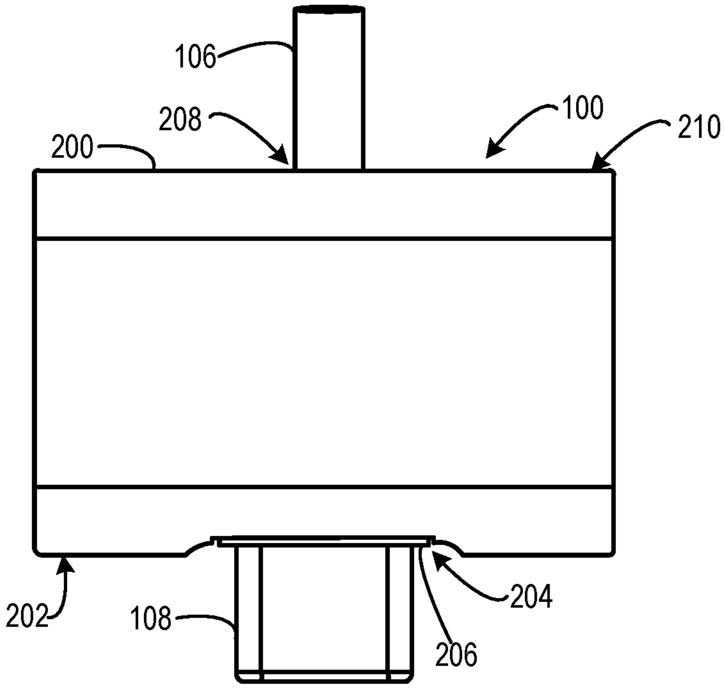
Figure 4:
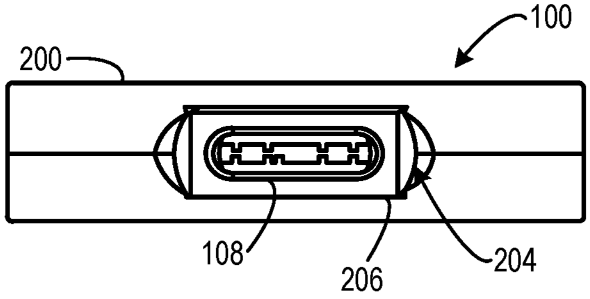

FIGS. 2-4 show different views of the retractable connector 100 shown in FIG. 1. FIG. 2 shows a perspective view of the retractable connector 100. FIG. 3 shows a top view of the retractable connector 100. FIG. 4 shows a front view of the retractable connector 100. These and other drawings may omit some parts/features of the connector in order to make more relevant parts/features easier to appreciate. The retractable connector 100 includes a housing 200 including a leading surface 202 that interfaces with a corresponding surface of an electronic device (e.g., an electronic device 600 shown in FIG. 6) when the retractable connector 100 is removably affixed to the electronic device. The leading surface 202 of the housing 200 forms a plug opening 204. The electronic plug 108 extends through the plug opening 204 away from the leading surface 202 of the housing 200. An internal retention structure 206 is coupled to the electronic plug 108. The internal retention structure 206 is at least partially contained within the housing 200 and moveably couples the electronic plug 108 to the housing 200, such that the electronic plug 108 selectively moves between an extended position and a retracted position relative to the housing 200.

A cable opening 208 is formed in a rear surface 210 of the housing 200. The cable 106 extends through the cable opening 208 away from the rear surface 210 of the housing 200. The cable 106 is electrically connectable to an external electrical power/data source to enable transmission of electrical power and/or data between the external electrical power/data source and the electronic device.

In the illustrated example, the housing 200 is formed from over-molded plastic (e.g., ABS). In other examples, the housing 200 is formed from/by one or more different material(s) and/or different manufacturing process(es). The housing 200 may be formed from any suitable material, manufactured using any suitable manufacturing process into a connector having any desired shape and/or configuration.

In the illustrated example, the electronic plug 108 is a USB-C compatible electronic plug that is configured to plug into a corresponding USB-C type plug receptacle of an electronic device. As such, the plug is reversible in that it may be plugged in either of two orientations. In other examples, the electronic plug is a different type of electronic plug (e.g., USB-A, USB 2.0B, USB 3.0B, USB 2.0 Micro, USB 3.0 Micro, USB Mini 5, Lightning, HDMI). The electronic plug may be any suitable type of plug that is configured to plug into a receptacle of an electronic device.

Figure 5:
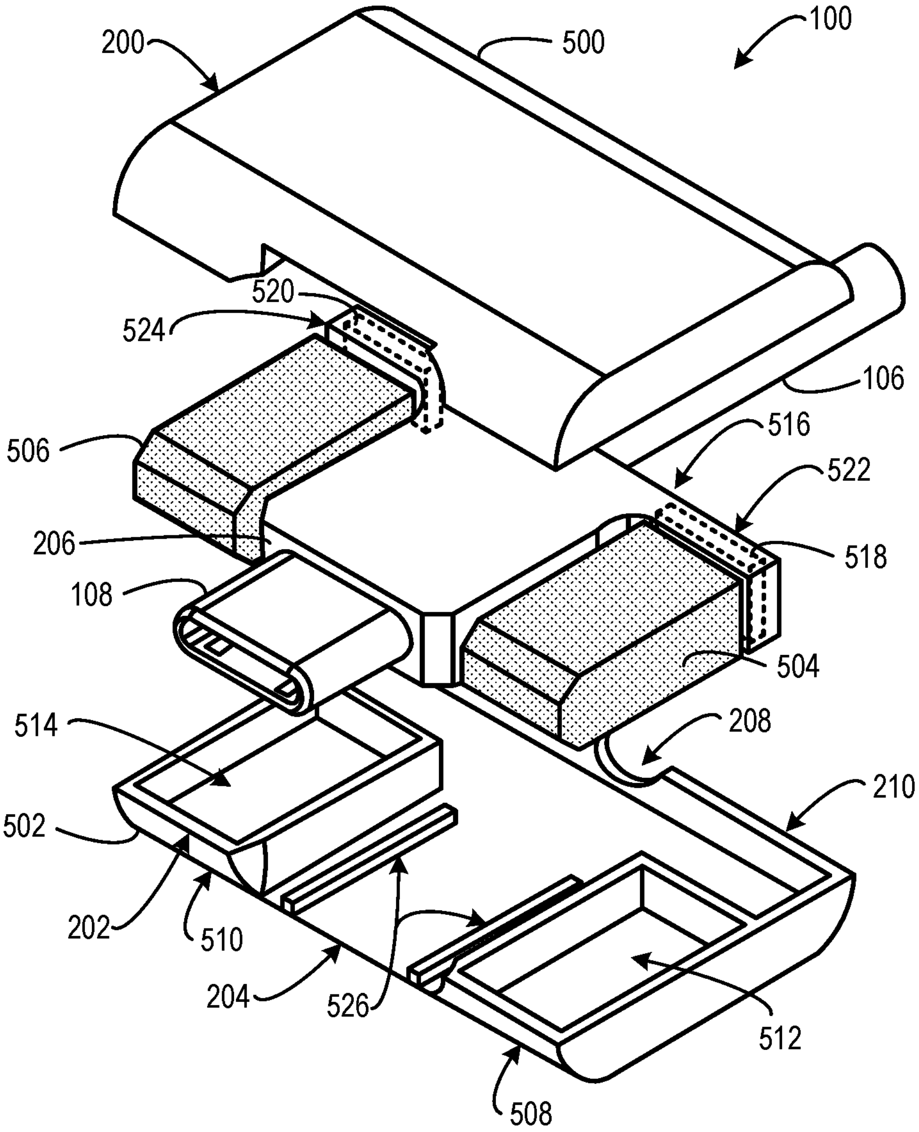
FIG. 5 shows an exploded view of an example retractable connector.

FIG. 5 shows an exploded view of the retractable connector 100. The housing 200 of the retractable connector 100 includes a top part 500 and a bottom part 502 that couple together to enclose components of the retractable connector 100 within the housing 200. The internal retention structure 206 is at least partially contained within the housing 200. The internal retention structure 206 moveably couples the electronic plug 108 to the housing 200, such that the electronic plug 108 is selectively moveable relative to the housing 200 between an extended position and a retracted position. In the illustrated example, the electronic plug 108 is in the extended position in which the electronic plug 108 extends through the plug opening 204 away from the leading surface 202 the housing 200.

The cable 106 passes through the cable opening 208 in the housing 200 and couples to the electronic plug 108 via the internal retention structure 206. When a pulling force is applied to the cable 106 away from the rear surface 210 of the housing 200, the internal retention structure 206 moves toward the rear surface 210 of the housing and the electronic plug 108 retracts at least partially into the housing 200.

The retractable connector 100 includes a first connecting magnet 504 and a second connecting magnet 506. The first connecting magnet 504 is positioned within the housing 200 on a first side 508 of the plug opening 204. The second connecting magnet 506 is within the housing 200 on a second side 510 of the plug opening 204 that opposes the first side 508. The first connecting magnet 504 is held in place by a cutout 512 formed in the bottom part 502 of the housing 200. The second connecting magnet 506 is held in place by a cutout 514 formed in the bottom part 502 of the housing 200.

The retractable connector 100 is removably affixable to an electronic device based at least on a magnetic attraction between the first and second connecting magnets 504, 506 and the electronic device. In some examples, the first and second connecting magnets 504, 506 are magnetically attracted to corresponding connecting magnets of the electronic device. In some examples, the first and second connecting magnets 504, 506 are magnetically attracted to ferromagnetic material of the electronic device, such as steel. The magnetic attraction provided by the first and second connecting magnets 504, 506 provides the technical benefit of allowing for various retention features to be omitted from the electronic plug 108, such that the electronic plug 108 has low-friction engagement with a plug receptacle that allows for easy insertion and removal of the electronic plug 108 to/from the plug receptacle and unwanted pulling of the electronic device upon a pulling force applied to the cable 106.

The retractable connector 100 includes a bias mechanism 516 biasing the electronic plug 108 to the extended position in which the electronic plug 108 extends through the plug opening 204 away from the leading surface 202 of the housing 200. In the illustrated example, the bias mechanism 516 is a magnetic bias mechanism that includes first and second bias magnets 518 and 520 operatively coupled to the electronic plug 108 via the internal retention structure 206, such that the first and second bias magnets 518 and 520 are moveable relative to the housing 200 as the electronic plug 108 and the internal retention structure 206 move relative to the housing 200.

The internal retention structure 206 includes a first wing 522 that extends laterally behind the first connecting magnet 504. The first bias magnet 518 is positioned in the first wing 522, such that the first bias magnet 518 is aligned behind the first connecting magnet 504. Likewise, the internal retention structure 206 includes a second wing 524 that extends laterally behind the second connecting magnet 506. The second bias magnet 520 is positioned in the second wing 524, such that the second bias magnet 520 is aligned behind the second connecting magnet 506. The bias mechanism 516 biases the electronic plug 108 to the extended position based at least on a magnetic attraction between the first bias magnet 518 and the first connecting magnet 504 and a magnetic attraction between the second bias magnet 520 and the second connecting magnet 506. The magnetic bias mechanism provides the technical benefit of biasing the electronic plug 108 to the extended position, so that the electronic plug 108 can properly align with a plug receptacle of an electronic device to affix the retractable connector 100 to the electronic device.

The first and second bias magnets 518, 520 are selected to have a strength of magnetic attraction that allows for the electronic plug 108 to retract through an entire range of retraction from the extended position to the retracted position based at least on a pulling force applied to the cable 106. In some examples, a magnetic strength between the bias magnets 518, 520 and the connecting magnets 504, 506 is less than a magnetic strength between the connecting magnets 504, 506 and an electronic device (e.g., retention magnets 606, 608 of the electronic device 600 shown in FIGS. 6-7), such that the electronic plug 108 moves to the retracted position before the pulling force exceeds a breakaway force sufficient to remove the retractable connector 108 from the electronic device. In one example, a threshold force for the bias magnets 518, 520 to break away from the connecting magnets 504, 506 is five (5) newtons, and a threshold force for the connecting magnets 504, 506 to break away from the electronic device is eight (8) newtons. However, the magnetic strength between the bias magnets 518, 520 and the connecting magnets 504, 506 and the magnetic strength between the connecting magnets 504, 506 and the electronic device may be any suitable magnetic strengths without departing from the scope of this disclosure. The difference in magnetic strengths between the connecting magnets and the bias magnets provides the technical benefit of allowing the electronic plug 108 to retract out of a plug receptacle of an electronic device prior to the retractable connector 100 breaking away from the electronic device based at least on a pulling force applied to the cable 106. In this way, the electronic device is not unwantedly pulled based on the cable 106 being pulled by the pulling force.

The housing 200 includes a pair of alignment guides 526 that keep the electronic plug 108 in alignment with the plug opening 204 as the electronic plug 108 moves between the extended position and the retracted position. The alignment guides 526 are railings that inhibit the electronic plug 108 from translating laterally or rotating relative to the plug opening 204 when the electronic plug 108 moves backward and forward relative to the housing 200. The alignment guides 526 provide the technical benefit of keeping the electronic plug 108 aligned with the plug opening 204, so that the electronic plug 108 can properly extend and retract while maintaining alignment with a plug receptacle.

Although not shown, the top part 500 of the housing 200 may also include features to maintain the electronic plug 108 in alignment with the plug opening 204. In some examples, the top part 500 of the housing 200 includes alignment guides that correspond to the pair of alignment guides 526 formed in the bottom part 502 of the housing 200 to collectively keep the electronic plug 108 in alignment with the plug opening 204. Additionally, the top part 500 of the housing 200 may include features that affix the internal retention structure 206 and the first and second connecting magnets 504, 506 in place within the housing 200. In some examples, the top part 500 of the housing 200 includes cutouts that correspond to the cutouts 512, 514 to affix the first and second connecting magnets 504, 506 in place within the housing 200. However, it should be noted that retractable connector 100 is a non-limiting example and various other configurations that allow for moveable adjustment of the electronic plug 108 fall within the scope of this disclosure.

In some examples, magnetic attraction between one permanent magnet and one magnetically compatible structure, such as a ferromagnetic structure (e.g., steel, iron), may be used instead of two permanent magnets.

Figure 6:
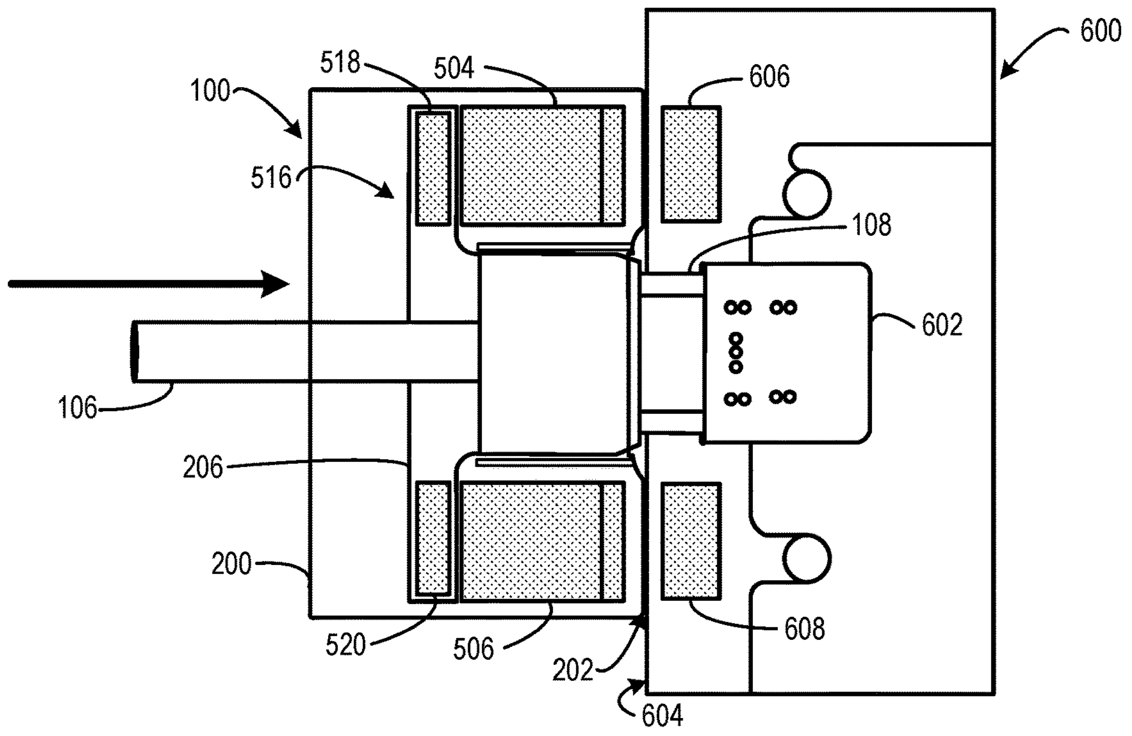
FIGS. 6-7 show interaction between an example retractable connector including a magnetic bias mechanism and an electronic device.
Figure 7:
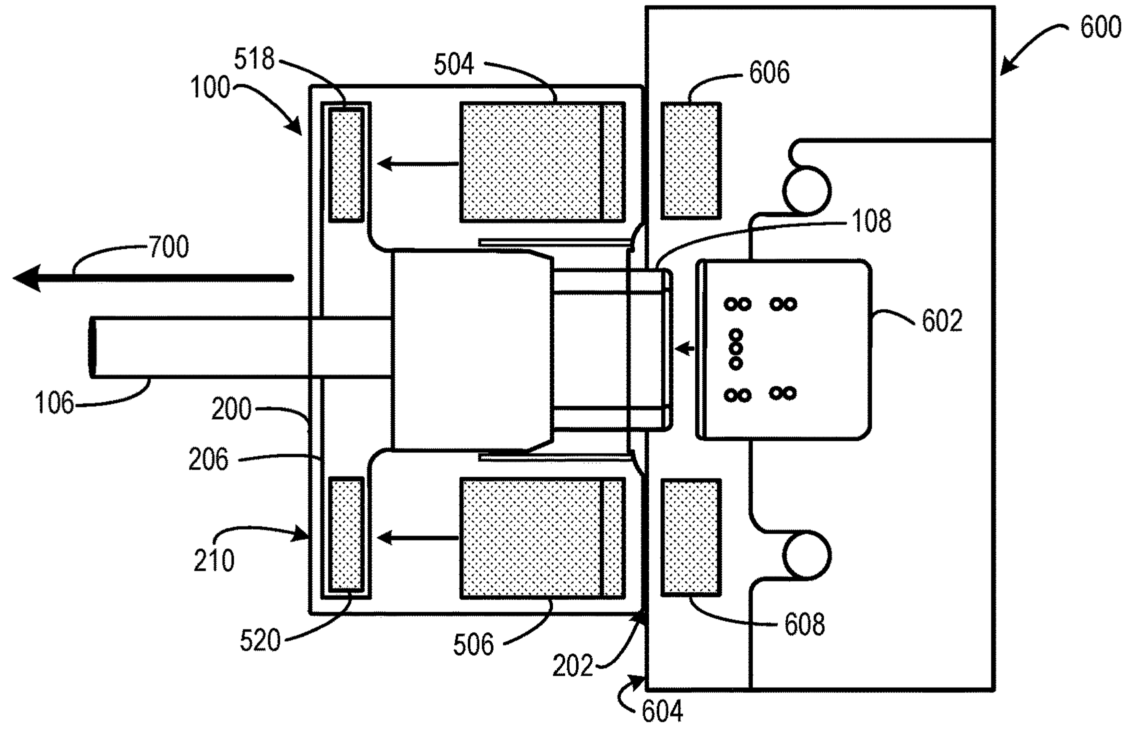

FIGS. 6-7 show interaction between the retractable connector 100 and an electronic device 600. In one example, the electronic device 600 corresponds to the laptop computer 102 shown in FIG. 1. In FIG. 6, the retractable connector 100 is aligned with a plug receptacle 602 of the electronic device 600 and the electronic plug 108 is biased in the extended position by the magnetic bias mechanism 516 to allow the electronic plug 108 to be inserted into the plug receptacle 602. The electronic plug 108 is biased to the extended position based at least on a magnetic attraction between the first and second bias magnets 518, 520 and the first and second connecting magnets 504, 506. In this plugged-in state, the leading surface 202 of the retractable connector 100 interfaces with a corresponding surface 604 of the electronic device 600. The first and second connecting magnets 504, 506 are magnetically attracted to corresponding first and second retention magnets 606, 608 of the electronic device 600. Such magnetic attraction contributes to removably affixing the retractable connector 100 to the electronic device 600. In some examples, the first and second retention magnets 606, 608 are omitted from the electronic device 600, and the first and second connecting magnets 504, 506 are magnetically attracted to ferromagnetic material, such as a steel frame, of the electronic device 600 to removably affix the retractable connector 100 to the electronic device 600.

FIG. 7 shows an example scenario in which a pulling force 700 is applied to the cable 106 of the retractable connector 100 to remove the retractable connector 100 from the electronic device 600. The difference in magnetic strength between the bias magnets 518, 520 and the connecting magnets 504, 506 creates a two-phase procedure of removing the retractable connector 100 from the plug receptacle 602 of the electronic device 600 based at least on the pulling force 700. When the pulling force 700 becomes greater than the magnetic strength between the bias magnets 518, 520 and the connecting magnets 504, 506, the internal retention structure 206 that is coupled to the cable 106 moves toward the rear surface of the housing 200. Correspondingly, the electronic plug 108 retracts out of the plug receptacle 602 and into the housing 200. Subsequently, as the pulling force 700 becomes greater than the magnetic strength between the connecting magnets 504, 506 and the retention magnets 606, 608 of the electronic device 600, the retractable connector 100 breaks away from the electronic device 600, such that the leading surface 202 of the retractable connector 100 no longer interfaces with the corresponding surface 604 of the electronic device 600. At this point, the electronic plug 108 has already retracted out of the plug receptacle. Once the pulling force 700 is no longer applied to the cable 106, the magnetic attraction between the bias magnets 518, 520 and the connecting magnets 504, 506 biases the electronic plug 108 to move forward from the retracted position to the extended position. Further, note that the magnetic attraction between the bias magnets 518, 520 and the connecting magnets 504, 506 is greater than the insertion force of the retractable connector 108 into the receptacle 602 when the retractable connector 108 is inserted into the receptacle 602 in order to avoid unintentional retraction of the retractable connector 100 into the housing 200.

The retraction of the electronic plug 108 out of the plug receptacle 602 prior to the retractable connector 100 breaking away from the electronic device 600 provides the technical benefit of reducing friction and/or binding between the electronic plug 108 and the plug receptacle 602 when the cable 106 being quickly pulled or jerked. This allows for the retractable connector 100 to be easily removed from the electronic device 600 with less force such that the electronic device 600 is not unwantedly pulled by the retractable connector 100. Additionally, the bias mechanism 516 biases the electronic plug to the extended position to facilitate alignment with a plug receptable when the electronic plug 108 is inserted into the plug receptacle. The bias mechanism 516 provides the technical benefit of reducing friction and/or misalignment between the electronic plug 108 and a plug receptacle when the electronic plug 108 is inserted into the plug receptacle.

Figure 8:
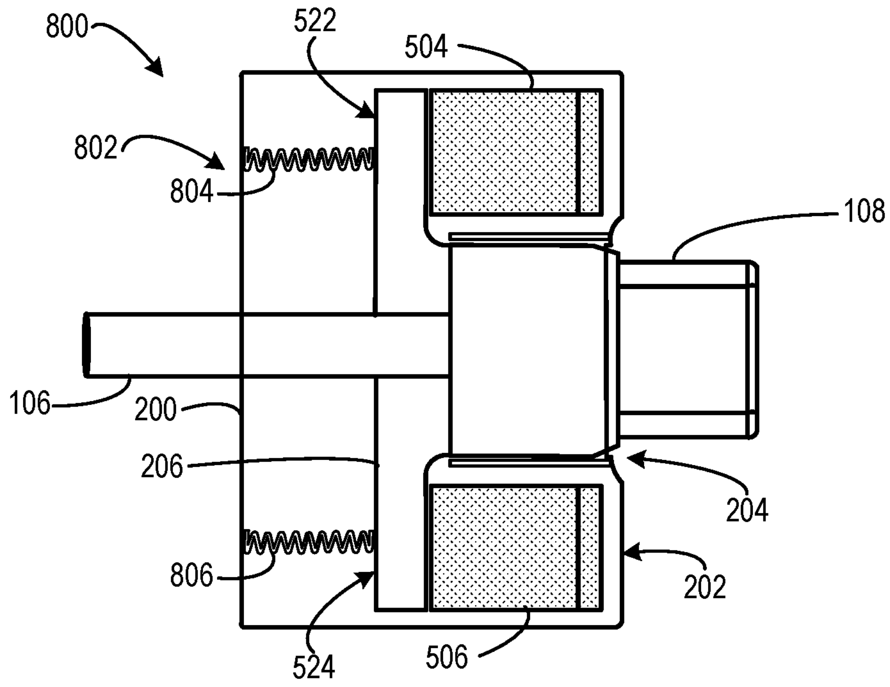
FIGS. 8-9 show an example retractable connector including a spring bias mechanism.
Figure 9:
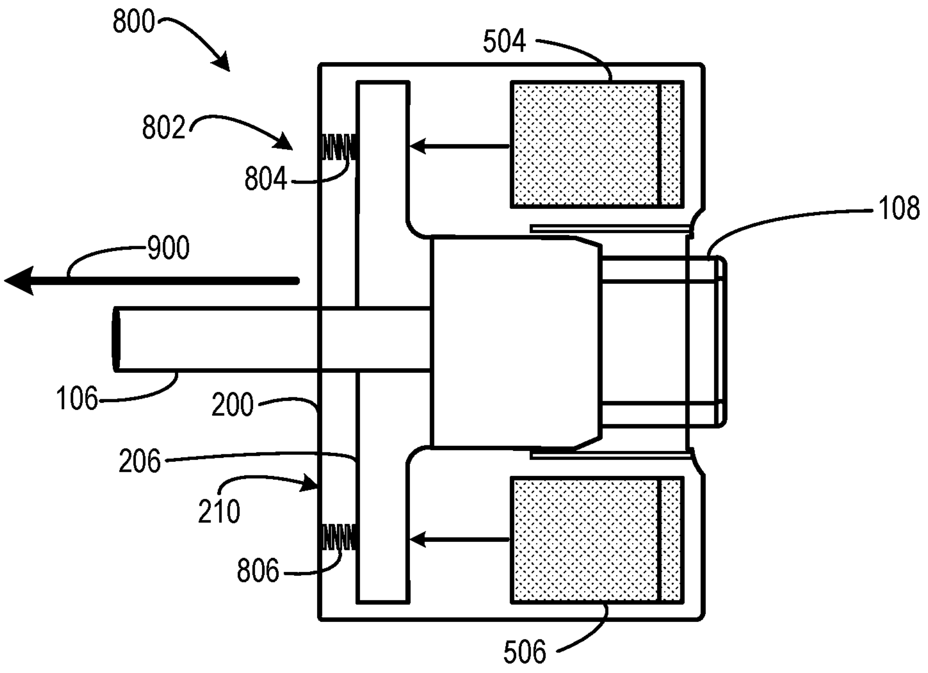

In some implementations, a retractable connector includes a spring bias mechanism that biases an electronic plug to an extended position. FIGS. 8-9 show a retractable connector 800 including a spring bias mechanism 802. Features of the retractable connector 800 that are common with the retractable connector 100 shown in FIGS. 1-7 are identified in the same way and are described no further. In the illustrated implementation, the spring bias mechanism 802 includes two springs positioned on opposing sides of the internal retention structure to bias the electronic plug 108 evenly, such that the electronic plug 108 maintains alignment with the plug opening 204. In particular, the spring bias mechanism 802 includes a first bias spring 804 operatively coupled between the housing 200 and the first wing 522 of the internal retention structure 206. The spring bias mechanism 802 further includes a second bias spring 806 operatively coupled between the housing 200 and the second wing 524 of the internal retention structure 206. The first and second bias springs 804, 806 provides the technical benefit of providing balanced spring bias on opposing sides of the electronic plug 108, such that the electronic plug 108 maintains alignment with the plug opening 204 when retracting and extending. Although it will be appreciated that the spring bias mechanism 802 may include any suitable number of bias springs to bias the electronic plug 108 to the extended position.

In FIG. 8, the spring bias mechanism 802 is shown biasing the electronic plug 108 to the extended position in which the electronic plug 108 extends through the plug opening 204 away from the leading surface 202 of the housing 200. In particular, a collective spring force of the first bias spring 804 and the second bias spring 806 bias the internal retention structure 206 against the first and second connecting magnets 504, 506 and correspondingly bias the electronic plug 108 to the extended position.

In FIG. 9, a pulling force 900 is applied to the cable 106. The pulling force is greater than a collective spring force of the first and second bias springs 804, 806 causing the first and second bias springs 804, 806 to compress. Such compression of the first and second bias springs 804, 806 allows for the internal retention structure 206 to move toward the rear surface 210 of the housing 200. Correspondingly, the electronic plug 108 moves into the housing 200 to a retracted position based at least on the pulling force 900 overcoming the collective spring force of the first and second bias springs 804, 806. The first and second bias springs 804, 806 may be selected to have any suitable spring force to bias the electronic plug 108 to the extended position.

In the illustrated example, the retractable connector 800 includes connecting magnets 504, 506 to removably affix the retractable connector 800 to an electronic device via magnetic attraction between the connecting magnets 504, 506 and the electronic device. In other examples, the connecting magnets 504, 506 may be omitted from the retractable connector 800.

In the illustrated example, biasing magnets are omitted from the retractable connector 800. In some examples, the retractable connector 800 incudes biasing magnets and springs that collectively bias the electronic plug 108 to the extended position.

Figure 10:
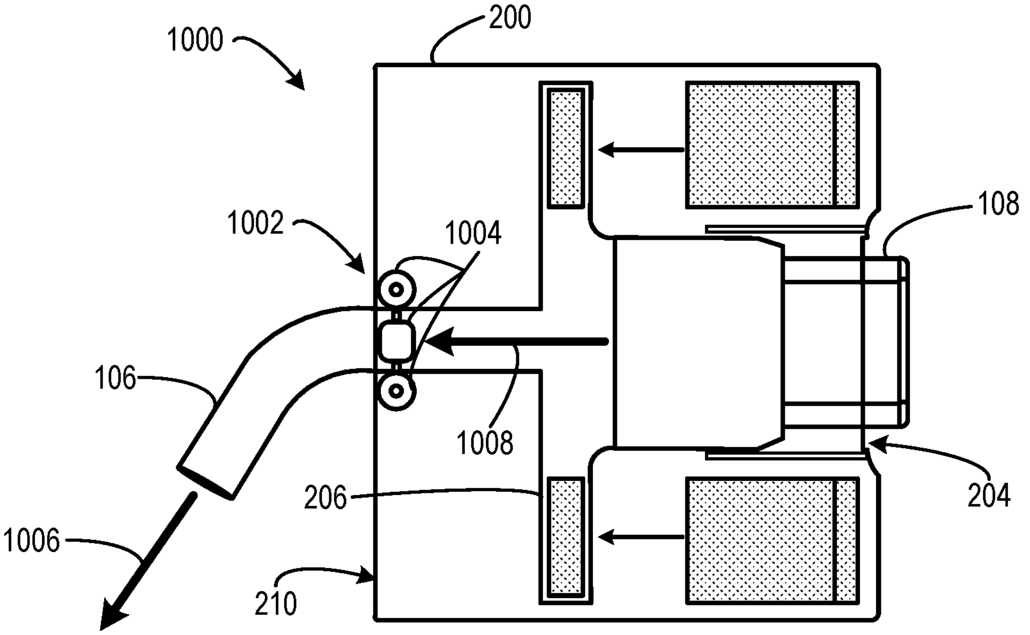
FIG. 10 shows an example retractable connector including a friction-reducing mechanism including a plurality of rollers.
Figure 11:
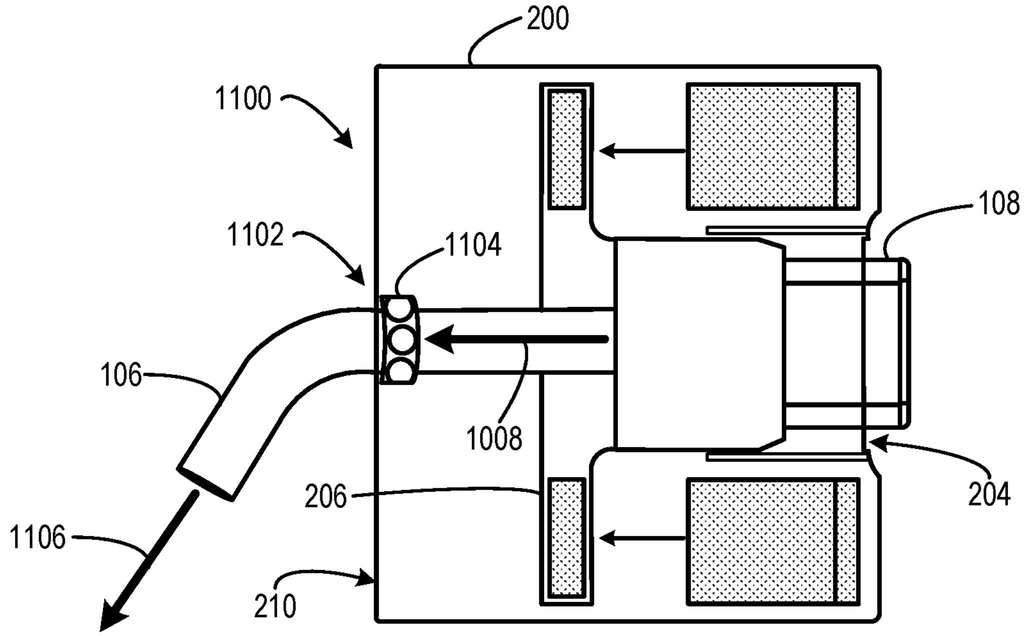
FIG. 11 shows an example retractable connector including a friction-reducing mechanism including a ball-bearing ring.

In some implementations, a retractable connector includes a friction-reducing mechanism that reduces friction resisting movement of the electronic plug from the extended position to the retracted position based at least on an off-axis pulling force applied to the cable. FIGS. 10-11 show retractable connectors including several types of friction-reducing mechanisms. Features of the retractable connectors shown in FIGS. 10-11 that are common with the retractable connector 100 shown in FIGS. 1-7 are identified in the same way and are described no further.

FIG. 10 shows an example retractable connector 1000 including a friction-reducing mechanism 1002 including a plurality of rollers 1004 in the housing 200. A roller is provided on each side of the cable 106. Note that the friction-reducing mechanism 1002 can include any suitable number of rollers. Each of the plurality of rollers 1004 spins based on a pulling force 1006 applied to the cable 106. In the illustrated example, the pulling force 1006 is an off-axis pulling force. The plurality of rollers 1004 spin as the cable 106 is being pulled back toward the rear surface 210 of the housing 200 by the off-axis pulling force 1006. The spinning of the plurality of rollers 1004 translates at least some of the off-axis pulling force 1006 to an on-axis force 1008 that provides the technical benefit of reducing friction that resists movement of the electronic plug 108 from the extended position to the retracted position and helps the internal retention structure 206/electronic plug 108 move straight back toward the rear surface 210 of the housing 200 to the retracted position.

FIG. 11 shows an example retractable connector 1100 including a friction-reducing mechanism 1102 including a ball-bearing ring 1104 in the housing 200. The ball-bearing ring 1104 surrounds the cable 106. The ball-bearing ring 1104 includes a plurality of ball bearings that each spin within the ball-bearing ring 1104 based on a pulling force 1106 applied to the cable 106. In the illustrated example, the pulling force 1106 is an off-axis pulling force. The ball bearings spin within the ball-bearing ring 1104 as the cable 106 is pulled back toward the rear surface 210 of the housing

200 by the off-axis pulling force 1106. The spinning of the ball bearings within the ball-bearing ring 1104 translates at least some of the off-axis pulling force 1106 to an on-axis force 1108 that provides the technical benefit of reducing friction that resists movement of the electronic plug 108 from the extended position to the retracted position and helps the internal retention structure 206/electronic plug 106 move straight back toward the rear surface 210 of the housing 200 to the retracted position.

Note that the size of the housing 200 may be increased to accommodate the friction-reducing mechanisms 1002, 1102 and allow for an amount of straight-line travel of the cable 106 within the housing 200. The friction-reducing mechanisms 1002, 1102 are provided as non-limiting examples. A retractable connector may include any suitable type of friction-reducing mechanism to help reduce friction that resists movement of the electronic plug 108 from the extended position to the retracted position on the cable and helps the electronic plug 108 move straight back into the housing 200.

In some implementations, a retractable connector includes a low-friction electronic plug that includes features that reduce friction between the low-friction electronic plug and a corresponding plug receptacle of an electronic device when the electronic plug is inserted into or removed from the plug receptacle.

Figure 12:
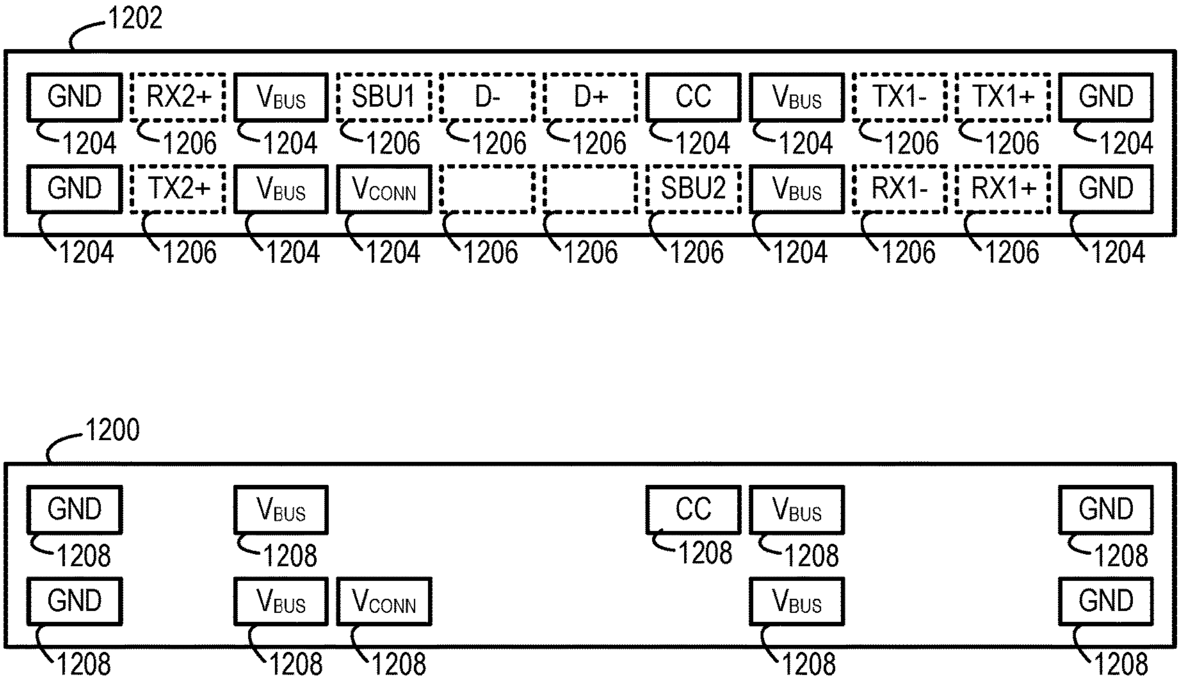
FIG. 12 shows pin layouts of an electronic plug of an example retractable connector and an example plug receptacle.

In some examples, a low-friction electronic plug includes a number of pins (N) that is less than a number of pin contacts (M) of a pin receptacle. Note that the numbers N and M may be any suitable numbers as long as N is less than M. FIG. 12 shows example pin layouts of a low-friction electronic plug 1200 of a retractable connector and a plug receptacle 1202 of an electronic device. For example, the low-friction electronic plug 1200 is representative of the electronic plug 108 of the retractable connector 100 shown in FIGS. 1-7, the retractable connector 800 shown in FIGS. 8-9, the retractable connector 1000 shown in FIG. 10, or the retractable connector 1100 shown in FIG. 11. The low-friction electronic plug 1200 includes a set of power pins 1208 configured to facilitate a transfer of electrical power through the low-friction electronic plug 1200 to the electronic device. In this example, the set of power pins 1208 includes ten (10) power pins, so in this example N equals ten (10).

In this example, the pin layout of the plug receptacle 1202 is that of a USB-C type plug receptacle. The plug receptacle 1202 includes a set of power pin contacts 1204 and a set of data pin contacts 1206. The set of power pin contacts 1204 include ten (10) pin contacts. The set of data pin contacts 1206 include fourteen (14) pin contacts. In this example, M equals twenty-four (24), and pin contacts that do not correspond to the set of power pins are data pin contacts. The set of power pin contacts 1204 interface with the set of power pins 1208 of the low-friction electronic plug 1200 to facilitate the transfer of electrical power to the electronic device. The set of data pin contacts 1206 facilitate the transmission and reception of data. However, in this example, the low-friction electronic plug 1200 lacks any data pins and thus does not have data transmission/reception functionality. Instead, the low-friction electronic plug 1200 provides electrical power transmission functionality.

When a pin interfaces with a pin contact friction is generated. By having less pins in the low-friction electronic plug than pin contacts in the plug receptacle, the amount of friction generated from the low-friction electronic plug being inserted into the plug receptacle is reduced relative to an electronic plug that has a greater number of pins interfacing with pin contacts of the plug receptacle. Such a reduction in friction provides the technical benefit of allowing for the low-friction electronic plug to be more easily inserted into the plug receptacle with less force. Further, such a reduction in friction allows for the low-friction electronic plug to be more easily removed from the plug receptacle with less force.

In other examples, a retractable connector includes both power pins and data pins to provide both electrical power and data transmission functionality at the cost of having higher friction engagement between the electronic plug and the plug receptacle.

Figure 13:
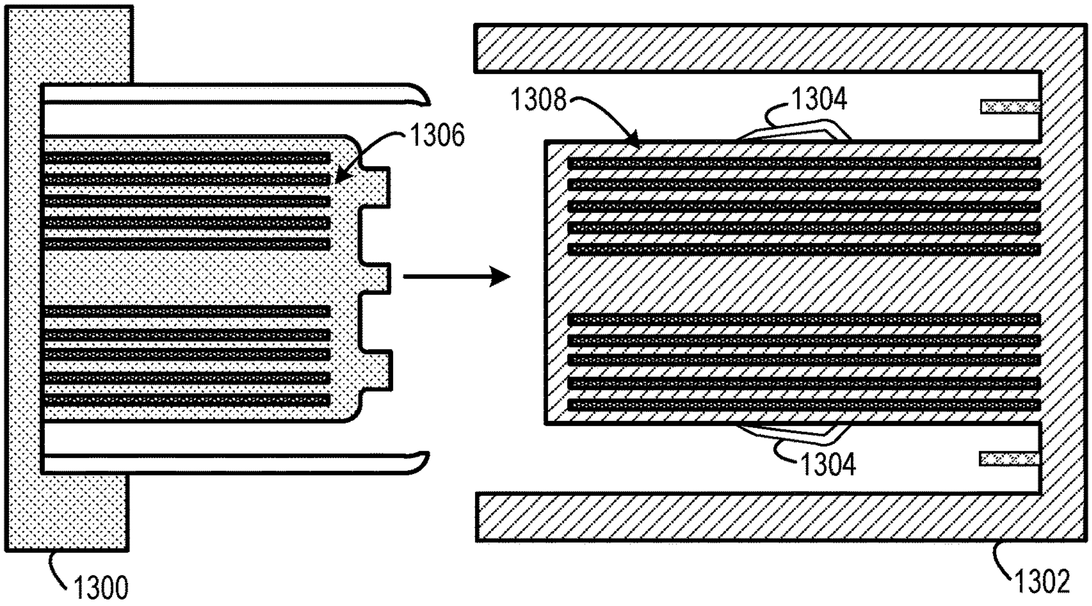
FIGS. 13 and 14 show low-friction features of an electronic plug of an example retractable connector.
Figure 14:
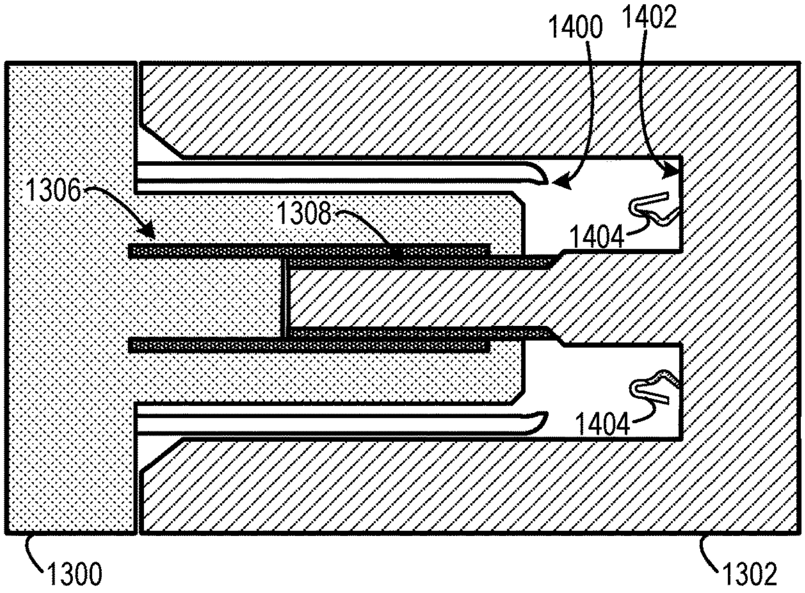

FIGS. 13 and 14 show additional low-friction features of a low-friction electronic plug 1300 of a retractable connector. FIG. 13 is a top view of the low-friction electronic plug 1300 and a plug receptacle 1302. FIG. 14 is a side view of the low-friction electronic plug 1300 and the plug receptacle 1302. For example, the low-friction electronic plug 1300 is representative of the electronic plug 108 of the retractable connector 100 shown in FIGS. 1-7, the retractable connector 800 shown in FIGS. 8-9, the retractable connector 1000 shown in FIG. 10, or the retractable connector 1100 shown in FIG. 11.

As shown in FIG. 13, in some examples, the plug receptacle 1302 includes a pair of retention detents 1304 that engage with a corresponding pair of retention latches of a high-friction electronic plug of a connector to retain the high-friction electronic plug in the plug receptacle 1302. However, the low-friction electronic plug 1300 lacks a pair of retention latches and instead the magnetic attraction between the connecting magnets 504, 506 (shown in FIGS. 5-9) and the corresponding retention magnets 606, 608 (shown in FIGS. 6-7) and/or ferromagnetic material of the electronic device is used to help secure the low-friction electronic plug 1300 in the plug receptacle 1302. In particular, when the low-friction electronic plug 1300 is inserted into the plug receptacle 1302, the low-friction electronic plug 1300 passes over the retention detents 1304 without engaging the retention detents 1304. When the low-friction electronic plug 1300 is inserted into the plug receptacle 1302, a plurality of pins 1306 of the low-friction electronic plug 1300 engage with a corresponding plurality of pin contacts 1308 of the plug receptacle 1302.

By not engaging the retention detents, the low-friction electronic plug 1300 provides the technical benefit of reducing the amount of friction generated from the low-friction electronic plug 1300 being inserted into the plug receptacle relative to a high-friction electronic plug that includes retention latches that engage with the retention detents 1304. Such a reduction in friction allows for the low-friction electronic plug 1300 to be more easily inserted into the plug receptacle 1302 with less force. Further, such a reduction in friction allows for the low-friction electronic plug 1300 to be more easily removed from the plug receptacle 1302 with less force.

As shown in FIG. 14, in some examples, the low-friction electronic plug 1300 has a shortened length (e.g., relative to a conventional USB-C type plug), such that a leading edge 1400 of the low-friction electronic plug 1300 does not extend to a backend 1402 of the plug receptacle 1302. In some examples, the plug receptacle 1302 includes a pair of ground pins 1404 positioned at the backend 1402 of the plug receptacle 1302. The low-friction electronic plug 1300 has a length short enough that the low-friction electronic plug 1300 does not electrically connect with the ground pins 1404 upon the low-friction electronic plug 1300 being inserted into the plug receptacle 1302. The ground pins 1404 reduce electromagnetic interference (EMI) noise of signals during data transmission between data pins and data pin contacts. Since the low-friction electronic plug 1300 does not have data transmission functionality, the low-friction electronic plug 1300 does not need to be electrically connected to the ground pins 1404.

Note that the low-friction electronic plug 1300 is long enough that when inserted into the plug receptacle 1302, the plurality of pins 1306 of the low-friction electronic plug 1300 engage with the corresponding plurality of pin contacts 1308 of the plug receptacle 1302.

By not engaging the ground pins 1404, the low-friction electronic plug 1300 provides the technical benefit of reducing the amount of friction generated from the low-friction electronic plug being inserted into the plug receptacle relative to a high-friction electronic plug that is long enough to engage the ground pins 1404. Such a reduction in friction allows for the low-friction electronic plug 1300 to be more easily inserted into the plug receptacle 1302 with less force. Further, such a reduction in friction allows for the low-friction electronic plug 1300 to be more easily removed from the plug receptacle 1302 with less force. Shortening the low-friction electronic plug 1300 also allows the connector housing leading edge 202 to contact the electronic device surface 604 (shown in FIGS. 6-7) bringing the connecting magnets 504, 506 closer to device side retention magnets 606, 608 (and/or ferromagnetic material) that provides the technical benefit of increasing the retention force between the retractable connector 100 and the electronic device 600.

In some examples, a retractable connector may include any combination of the above described low-friction features to provide low friction engagement between a low-friction electronic plug and a plug receptacle. Moreover, each of the above-described features provide the technical benefit of reducing or eliminating undesirably pulling/moving the electronic device responsive to pulling on the retractable connector's power cord.

In an example, a connector comprises a housing including a plug opening and a cable opening, a cable extending through the cable opening away from the housing, an electronic plug connected to the cable within the housing and extending through the plug opening away from the housing, wherein the electronic plug is selectively moveable relative to the housing between an extended position and a retracted position based at least on a pulling force applied to the cable, and a bias mechanism biasing the electronic plug to the extended position. In this example and/or other examples, the connector may further comprise a connecting magnet within the housing, the connector may be removably affixable to an electronic device based at least on a magnetic attraction between the connecting magnet and the electronic device. In this example and/or other examples, the bias mechanism may include a bias magnet operatively coupled to the electronic plug, the bias mechanism biasing the electronic plug to the extended position based at least on a magnetic attraction between the bias magnet and the connecting magnet. In this example and/or other examples, a magnetic strength between the bias magnet and the connecting magnet may be less than a magnetic strength between the connecting magnet and the electronic device, such that the electronic plug moves to the retracted position before the pulling force exceeds a breakaway force sufficient to remove the connector from the electronic device. In this example and/or other examples, the connecting magnet may be a first connecting magnet positioned within the housing on a first side of the plug opening, the connector may further comprise a second connecting magnet within the housing on a second side of the plug opening that opposes the first side, and the connector may be removably affixable to the electronic device based at least on a magnetic attraction between the first and second connecting magnets and the electronic device. In this example and/or other examples, the bias mechanism may include first and second bias magnets operatively coupled to the electronic plug, the bias mechanism biasing the electronic plug to the extended position based at least on a magnetic attraction between the first bias magnet and the first connecting magnet and a magnetic attraction between the second bias magnet and the second connecting magnet. In this example and/or other examples, the bias mechanism may include a bias spring that biases the electronic plug to the extended position, and the electronic plug may move to the retracted position based at least on overcoming a spring force of the bias spring. In this example and/or other examples, the connector may further comprise a friction-reducing mechanism reducing friction resisting movement of the electronic plug from the extended position to the retracted position based at least on an off-axis pulling force being applied to the cable to thereby help the electronic plug move straight back to the retracted position. In this example and/or other examples, the housing may include an alignment guide that keeps the electronic plug aligned with the plug opening as the electronic plug moves between the extended position and the retracted position. In this example and/or other examples, the connector may be configured to electrically connect to an electronic device via insertion of the electronic plug into a plug receptacle of the electronic device, the electronic plug may include a number of pins (N) that is less than a number of pin contacts (M) of the plug receptacle. In this example and/or other examples, the number of pins (N) may correspond to a set of power pins configured to facilitate a transfer of electrical power through the connector to the electronic device, and pin contacts of the number of pin contacts (M) that do not correspond to the set of power pins may be data pin contacts. In this example and/or other examples, the connector may be configured to electrically connect to an electronic device via insertion of the electronic plug into a plug receptacle of the electronic device, the plug receptacle may include a pair of retention detents configured to engage with a corresponding pair of retention latches of a high-friction electronic plug, and the electronic plug may be a low-friction electronic plug that lacks a pair of retention latches. In this example and/or other examples, the connector may be configured to electrically connect to an electronic device via insertion of the electronic plug into a plug receptacle of the electronic device, the plug receptacle may include a ground pin positioned at a backend of the plug receptacle, and the electronic plug may be a low-friction electronic plug having a shortened length, such that the low-friction electronic plug does not electrically connect with the ground pin upon the low-friction electronic plug being inserted into the plug receptacle.

In another example, a connector comprises a housing including a plug opening and a cable opening, a connecting magnet within the housing, wherein the connector is removably affixable to an electronic device based at least on a magnetic attraction between the connecting magnet and the electronic device, a cable extending through the cable opening away from the housing, an electronic plug connected to the cable within the housing and extending through the plug opening away from the housing, wherein the electronic plug is selectively moveable relative to the housing between an extended position and a retracted position, and a bias mechanism including a bias magnet operatively coupled to the electronic plug, the bias mechanism biasing the electronic plug to the extended position based at least on a magnetic attraction between the bias magnet and the connecting magnet. In this example and/or other examples, a magnetic strength between the bias magnet and the connecting magnet may be less than a magnetic strength between the connecting magnet and the electronic device, such that the electronic plug moves to the retracted position before a pulling force that is applied to the cable exceeds a breakaway force sufficient to remove the connector from the electronic device. In this example and/or other examples, the connecting magnet may be a first connecting magnet positioned within the housing on a first side of the plug opening, the connector may further comprise a second connecting magnet within the housing on a second side of the plug opening that opposes the first side, and the connector may be removably affixable to the electronic device based at least on a magnetic attraction between the first and second connecting magnets and the electronic device. In this example and/or other examples, the bias mechanism may include first and second bias magnets operatively coupled to the electronic plug, the bias mechanism biasing the electronic plug to the extended position based at least on a magnetic attraction between the first bias magnet and the first connecting magnet and a magnetic attraction between the second bias magnet and the second connecting magnet. In this example and/or other examples, the connector may further comprise a friction-reducing mechanism reducing friction resisting movement of the electronic plug from the extended position to the retracted position based at least on an off-axis pulling force being applied to the cable to thereby help the electronic plug move straight back to the retracted position. In this example and/or other examples, the housing may include an alignment guide that keeps the electronic plug aligned with the plug opening as the electronic plug moves between the extended position and the retracted position.

In yet another example, a connector comprises a housing including a plug opening and a cable opening, a connecting magnet within the housing, wherein the connector is removably affixable to an electronic device based at least on a magnetic attraction between the connecting magnet and the electronic device, a cable extending through the cable opening away from the housing, an electronic plug connected to the cable within the housing and extending through the plug opening away from the housing, wherein the electronic plug is selectively moveable relative to the housing between an extended position and a retracted position based at least on a pulling force applied to the cable, and a bias mechanism including a bias magnet operatively coupled to the electronic plug, the bias mechanism biasing the electronic plug to the extended position based at least on a magnetic attraction between the bias magnet and the connecting magnet, wherein a magnetic strength between the bias magnet and the connecting magnet is less than a magnetic strength between the connecting magnet and the electronic device, such that the electronic plug moves to the retracted position before the pulling force exceeds a breakaway force sufficient to remove the connector from the electronic device.

It will be understood that the configurations and/or approaches described herein are exemplary in nature, and that these specific implementations or examples are not to be considered in a limiting sense, because numerous variations are possible. The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. A connector comprising:

a housing including a plug opening and a cable opening;

a connecting magnet within the housing, wherein the connector is removably affixable to an electronic device based at least on a magnetic attraction between the connecting magnet and the electronic device;

a cable extending through the cable opening away from the housing;

an electronic plug connected to the cable within the housing, wherein the electronic plug is selectively moveable between an extended position and a retracted position; and a bias mechanism including a bias magnet operatively coupled to the electronic plug, the bias mechanism biasing the electronic plug to the extended position based at least on a magnetic attraction between the bias magnet and the connecting magnet.

2. The connector of claim 1, wherein a magnetic strength between the bias magnet and the connecting magnet is less than a magnetic strength between the connecting magnet and the electronic device, such that the electronic plug moves to the retracted position before a pulling force applied to the cable exceeds a breakaway force sufficient to remove the connector from the electronic device.

3. The connector of claim 1, wherein the connecting magnet is a first connecting magnet positioned within the housing on a first side of the plug opening, wherein the connector further comprises a second connecting magnet within the housing on a second side of the plug opening that opposes the first side, and wherein the connector is removably affixable to the electronic device based at least on a magnetic attraction between the first and second connecting magnets and the electronic device.

4. The connector of claim 3, wherein the bias mechanism includes first and second bias magnets operatively coupled to the electronic plug, the bias mechanism biasing the electronic plug to the extended position based at least on a magnetic attraction between the first bias magnet and the first connecting magnet and a magnetic attraction between the second bias magnet and the second connecting magnet.

5. The connector of claim 1, wherein the bias mechanism includes a bias spring that biases the electronic plug to the extended position, and wherein the electronic plug moves to the retracted position based at least on overcoming a spring force of the bias spring.

6. The connector of claim 1, further comprising a friction-reducing mechanism reducing friction resisting movement of the electronic plug from the extended position to the retracted position based at least on an off-axis pulling force being applied to the cable to thereby help the electronic plug move straight back to the retracted position.

7. The connector of claim 1, wherein the housing includes an alignment guide that keeps the electronic plug aligned with the plug opening as the electronic plug moves between the extended position and the retracted position.

8. The connector of claim 1, wherein the connector is configured to electrically connect to the electronic device via insertion of the electronic plug into a plug receptacle of the electronic device, wherein the electronic plug includes a number of pins (N) that is less than a number of pin contacts (M) of the plug receptacle.

9. The connector of claim 8, wherein the number of pins (N) corresponds to a set of power pins configured to facilitate a transfer of electrical power through the connector to the electronic device, and wherein pin contacts of the number of pin contacts (M) that do not correspond to the set of power pins are data pin contacts.

10. The connector of claim 1, wherein the connector is configured to electrically connect to the electronic device via insertion of the electronic plug into a plug receptacle of the electronic device, wherein the plug receptacle includes a pair of retention detents configured to engage with a corresponding pair of retention latches of a high-friction electronic plug, and wherein the electronic plug is a low-friction electronic plug that lacks a pair of retention latches.

11. The connector of claim 1, wherein the connector is configured to electrically connect to the electronic device via insertion of the electronic plug into a plug receptacle of the electronic device, wherein the plug receptacle includes a ground pin positioned at a backend of the plug receptacle, and wherein the electronic plug is a low-friction electronic plug having a shortened length, such that the low-friction electronic plug does not electrically connect with the ground pin upon the low-friction electronic plug being inserted into the plug receptacle.

12. A connector comprising:

a housing including a plug opening and a cable opening;

a connecting magnet within the housing, wherein the connector is removably affixable to an electronic device based at least on a magnetic attraction between the connecting magnet and the electronic device;

a cable extending through the cable opening away from the housing;

an electronic plug connected to the cable within the housing and extending through the plug opening away from the housing, wherein the electronic plug and the cable are selectively moveable relative to the housing between an extended position and a retracted position; and a bias mechanism including a bias magnet operatively coupled to the electronic plug, the bias mechanism biasing the electronic plug to the extended position based at least on a magnetic attraction between the bias magnet and the connecting magnet.

13. The connector of claim 12, wherein a magnetic strength between the bias magnet and the connecting magnet is less than a magnetic strength between the connecting magnet and the electronic device, such that the electronic plug moves to the retracted position before a pulling force that is applied to the cable exceeds a breakaway force sufficient to remove the connector from the electronic device.

14. The connector of claim 12, wherein the connecting magnet is a first connecting magnet positioned within the housing on a first side of the plug opening, wherein the connector further comprises a second connecting magnet within the housing on a second side of the plug opening that opposes the first side, and wherein the connector is removably affixable to the electronic device based at least on a magnetic attraction between the first and second connecting magnets and the electronic device.

15. The connector of claim 12, wherein the bias mechanism includes first and second bias magnets operatively coupled to the electronic plug, the bias mechanism biasing the electronic plug to the extended position based at least on a magnetic attraction between the first bias magnet and the first connecting magnet and a magnetic attraction between the second bias magnet and the second connecting magnet.

16. The connector of claim 12, further comprising a friction-reducing mechanism reducing friction resisting movement of the electronic plug from the extended position to the retracted position based at least on an off-axis pulling force being applied to the cable to thereby help the electronic plug move straight back to the retracted position.

17. The connector of claim 14, wherein the housing includes an alignment guide that keeps the electronic plug aligned with the plug opening as the electronic plug moves between the extended position and the retracted position.

18. A connector comprising:

a housing including a plug opening and a cable opening;

a connecting magnet within the housing, wherein the connector is removably affixable to an electronic device based at least on a magnetic attraction between the connecting magnet and the electronic device;

a cable extending through the cable opening away from the housing;

an electronic plug connected to the cable within the housing and extending through the plug opening away from the housing, wherein the electronic plug and the cable are selectively moveable relative to the housing between an extended position and a retracted position based at least on a pulling force applied to the cable; and a bias mechanism including a bias magnet operatively coupled to the electronic plug, the bias mechanism biasing the electronic plug to the extended position based at least on a magnetic attraction between the bias magnet and the connecting magnet, wherein a magnetic strength between the bias magnet and the connecting magnet is less than a magnetic strength between the connecting magnet and the electronic device, such that the electronic plug moves to the retracted position before the pulling force exceeds a breakaway force sufficient to remove the connector from the electronic device.

* * * * *